Dec. 29, 1970  L. W. KUHN ET AL  3,550,489
TURRET HEAD FOR QUICK-CHANGE TOOL
Filed Oct. 25, 1968  2 Sheets-Sheet 2

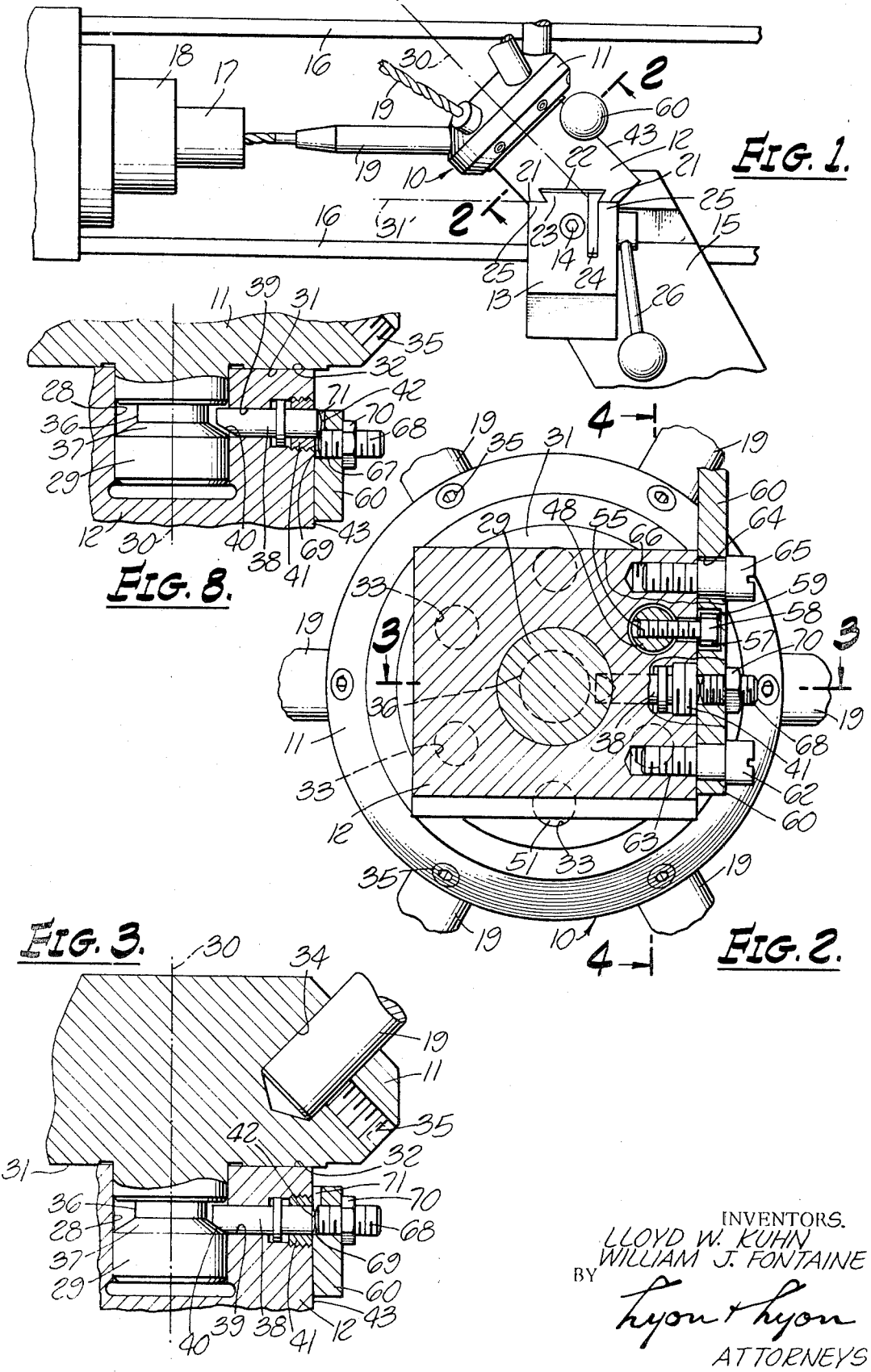

INVENTORS.
LLOYD W. KUHN
WILLIAM J. FONTAINE
BY Lyon & Lyon
ATTORNEYS

US Patent Office
3,550,489
Patented Dec. 29, 1970

3,550,489
TURRET HEAD FOR QUICK-CHANGE TOOL
Lloyd W. Kuhn, 9900 S. Haledon Ave., Downey, Calif. 90240, and William J. Fontaine, Venice, Fla.; said Fontaine assignor to said Kuhn
Filed Oct. 25, 1968, Ser. No. 770,735
Int. Cl. B23b 29/24
U.S. Cl. 82—36    9 Claims

ABSTRACT OF THE DISCLOSURE

A turret head assembly for a lathe or other machine tool secured thereto by means of a quick-change tool holder has a turret head for supporting a plurality of tools, the turret head having a stub shaft received in a recess on a body. A lever pivotally mounted on the body actuates a sliding plunger which is received in any one of a plurality of openings on the turret head, and the same lever also actuates a wedging pin which extends into a groove on the stub shaft to hold confronting faces on the turret and body in solid contact. The axis of the turret intersects the plane of the body support faces at a 45° angle.

---

This invention relates to machine tools and is particularly directed to a turret head attachment which is adapted to be detachably mounted on a quick-change tool holder of the type shown in the Miller Pat. 3,107,562. The objects of this invention are to provide a turret head attachment of compact form and minimum overall dimensions which provides a rugged support for a plurality of tools, together with a single lever actuator which operates a plunger to hold the turret in any one of a plurality of positions, and which lever actuator also operates a wedge pin to clamp the turret rigidly to the body in any selected position. Other and more detailed objects and advantages will appear hereinafter.

In the drawings:

FIG. 1 is a top plan view partly broken away, showing a preferred embodiment of this invention in use on an engine lathe.

FIG. 2 is a sectional elevation taken substantially on the line 2—2 as shown in FIG. 1.

FIG. 3 is a sectional plan view partly broken away, taken substantially on the line 3—3 as shown in FIG. 2.

FIG. 8 is a view similar to FIG. 3, showing the lever and wedge pin in retracted position.

Figure 5:
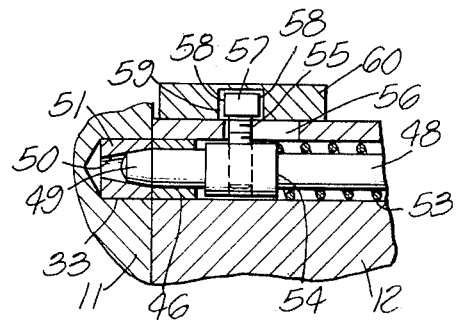
FIG. 5 is a sectional detail taken on the line 5—5 as shown in FIG. 4.

Referring to the drawings, the turret head assembly generally designated 10 includes a rotary turret 11 mounted on a stationary body 12. A quick-change tool head 13 of the type shown in the Miller Pat. 3,107,562 is adapted to be secured by a mounting bolt 14 to the compound slide 15 of an engine lathe having ways 16. A work piece 17 supported in a rotating chuck 18 is adapted to be contacted sequentially by a plurality of tools 19 mounted in spaced relation on the turret 11.

The body 12 has a pair of spaced coplanar support faces 21 interrupted by a dovetail recess 22. This projection includes a movable locking wedge 24 which serves to clamp the support faces 21 against the corresponding abutment faces 24 provided on the tool head 13. Manual operation of the clamping lever 25 moves the wedge 24 to locking position.

The body 12 is provided with a cylindrical recess 28 at one end for reception of the stub shaft 29 formed integrally on the turret 11. As shown in FIG. 1, the axis 30 of the recess 28 and stub shaft 29 intersects the plane 31' of the faces 21 and 25 at a 45° angle. The confronting surfaces 31 and 32 on the turret 11 and body 12, respectively, are normal to this axis 30. Openings 33 are provided in the turret face 31, one adjacent each of the sockets 34 which receive the individual tools 19. Set screws 35 are provided for locking each of the tools 19 in place on the turret 11.

Means are provided for releasably clamping the confronting faces 31 and 32 together, and as shown in the drawings, this means includes a groove 36 provided on the stub shaft 29 and having a taper surface 37. A wedging pin 38 is mounted in a radial bore 39 in the body and is provided with a wedge surface 40 shaped to engage the taper surface 37 on the stub shaft 29. A retainer bushing 41 slidably supports a portion of the pin 38 and a crowned end 42 of the pin 38 projects beyond the side face 43 of the body 12.

The body 12 is provided with a bore 45 extending parallel to the axis 30, and bushings 46 and 47 are provided at opposite ends of this bore. A plunger 48 is positioned in the bore 45 and slides in the bushings 46 and 47. The forward tapered end 49 of the plunger is received within the tapered bore 50 of any one of a plurality of bushings 51 mounted in the openings 33 in the turret 11. A coil spring 53 is positioned between the bushing 47 and a shoulder 54 provided on the plunger 48 and acts to move the plunger end 49 into engagement with any one of the taper bores 50.

Figure 4:
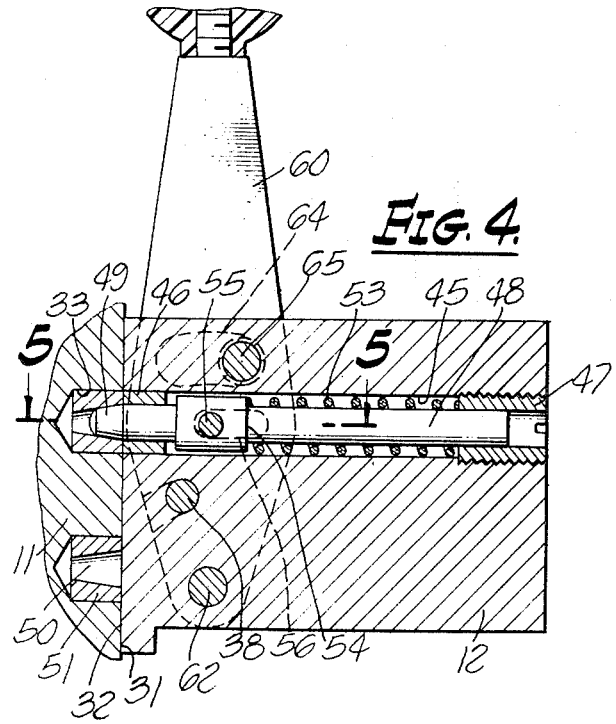
FIG. 4 is a sectional detail taken substantially on the line 4—4 as shown in FIG. 2, and illustrating the lever in forward position.
Figure 6:
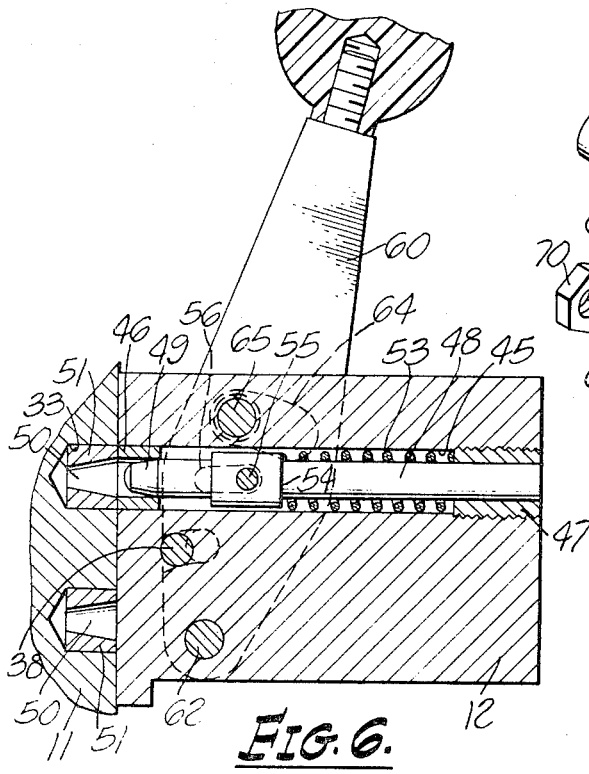
FIG. 6 is a sectional view similar to FIG. 4, showing the lever in retracted position.
Figure 7:
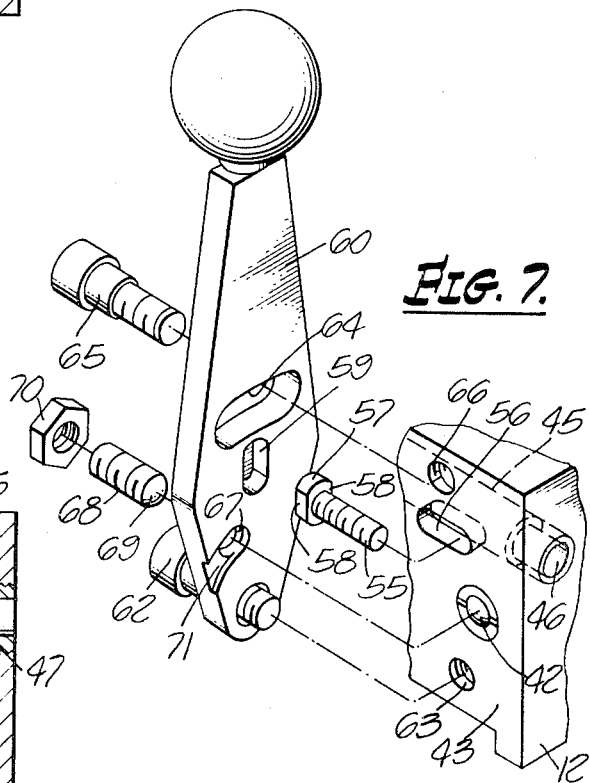
FIG. 7 is an exploded view showing details of mounting of the lever with respect to the body.

Means are provided for retracting the plunger 48 from the position shown in FIG. 4 to the position shown in FIG. 6, and as shown in the drawings this means includes a transverse threaded element 55 secured to the plunger 48 and projecting through an axially extending slot 56 in the body 12. The threaded element 55 has a head 57 provided with parallel faces 58 received within a blind slot or recess 59 provided on the lever 60. The parallel faces 58 on the head of the threaded element 55 have a sliding fit between the parallel walls of the slot 59.

The lever 60 is positioned adjacent the side face 43 of the body 12 and is pivotally mounted on a bolt 62 secured in a threaded opening 63 on the body 12. Pivotal motion of the lever 60 with respect to the body 12 is limited in each direction by contact with the ends of an arcuate slot 64 which receives the stop bolt 65 fixed in the threaded opening 66 in the body 12. A threaded opening 67 in the lever 60 receives the machine screw 68 having a crowned end 69. The lock nut 70 fixes the machine screw 68 in adjusted position. An arcuate recess 71 extends from the threaded opening 67 to an adjacent edge of the lever 60 to provide clearance for the projecting end 32 of the wedging pin 38. The crowned end 69 of the screw 68 engages the crowned end 42 of the wedging pin 38 when the lever 60 is in the forward position shown in FIG. 4, thereby moving the pin 38 radially inward to engage the wedge surface 40 with the taper surface 37 on the stub shaft 29.

From the foregoing description it will be understood that when the lever 60 is in the forward position shown in FIG. 4, the forward end 49 of the plunger 48 is engaged within the taper bore 50 of one of the bushings 51 in the turret 30 to prevent relative rotary movement between the turret 11 and the body 12. Also, the screw 68 on the lever 60 forces the wedging pin 38 into locking position to hold the confronting faces 31 and 32 in engagement, thereby preventing any relative axial movement between the plunger 11 and the body 12. The turret is thus solidly supported and locked in position. When the lever 60 is manually retracted to the position shown in FIG. 6 against the action of the coil spring 53, the plunger 48 is retracted by the threaded element 55 to withdraw the tapered end 49 from the turret bushings 51, and the screw 68 allows the wedging pin 38 to move away from the taper surface 37 on the stub shaft 29. The turret 11 is then free to be manually turned with respect to the body 12, to bring any one of the individual tools 19 into operative position.

Having fully described our invention, it is to be understood that we are not to be limited to the details herein set forth but that our invention is of the full scope of the appended claims.

We claim:

1. For use with a quick-change tool head having releasable means for clamping a tool holder against spaced abutment faces, a tool holder body having spaced support faces adapted for surface contact with the abutment faces, the body having a recess at one end, a turret having means for securing tools thereto in circumferentially spaced relation, said turret having an axial stub shaft mounted to turn in said recess, said stub shaft having a peripheral groove, confronting surfaces on said body and said turret, a pin mounted on said body for movement into said groove to bring said confronting surfaces into engagement, said turret having a series of circumferentially spaced openings, a plunger mounted for movement on said body for reception into any one of said openings in the turret, a lever pivotally mounted on the body, and means on said lever for actuating said pin and said plunger.

2. The combination set forth in claim 1 in which said pin moves radially with respect to said groove.

3. The combination set forth in claim 1 in which the plunger moves in a direction parallel to the axis of the stub shaft.

4. The combination set forth in claim 1 in which said openings are positioned in the confronting surface on the turret.

5. For use with a quick-change tool head having releasable means for clamping a tool holder against spaced coplanar abutment faces, a tool holder body having spaced coplanar support faces adapted for surface contact with the abutment faces, the body having a cylindrical recess at one end, the cylindrical recess having an axis intersecting the plane of said support faces at an acute angle, a turret having means for securing a plurality of tools thereto in circumferentially spaced relation, said turret having an axial stub shaft mounted to turn in said recess, said stub shaft having a peripheral groove, confronting surfaces on said body and said turret, a wedging pin mounted on said body for radial movement into said groove to bring said confronting surfaces into engagement, said turret having a series of circumferentially spaced openings, a plunger mounted for movement on said body in a direction parallel to the said axis for reception into any one of said openings in the turret, a lever pivotally mounted on the body, means on said lever for actuating said pin, and means on said lever for retracting said plunger.

6. Turret head apparatus comprising, in combination: a tool holder body having a cylindrical recess at one end, a turret having circumferentially spaced means for securing tools thereto and having an axial stub shaft mounted to turn in said recess, said stub shaft having a peripheral groove, confronting surfaces on said body and said turret, a pin mounted on said body for movement into said groove to bring said confronting surfaces into engagement, said turret having a series of circumferentially spaced openings, a plunger mounted for movement on said body for reception into any one of said openings in the turret, a lever pivotally mounted on the body, and means on said lever for actuating said pin and said plunger.

7. The combination set forth in claim 6 in which said pin moves radially with respect to said groove.

8. The combination set forth in claim 6 in which the plunger moves in a direction parallel to the axis of the stub shaft.

9. The combination set forth in claim 6 in which said openings are positioned in the confronting surface on the turret.

References Cited

UNITED STATES PATENTS

| 1,227,486 | 5/1917 | Newman et al. |
| 2,474,675 | 6/1949 | Jankowski. |

FOREIGN PATENTS

| 740,491 | 11/1955 | Great Britain. |

ANDREW R. JUHASZ, Primary Examiner

L. GILDEN, Assistant Examiner

U.S. Cl. XR.

74—813